United States Patent [19]

McCullough et al.

[11] 4,113,842

[45] Sep. 12, 1978

[54] PREPARATION OF DICALCIUM PHOSPHATE FROM PHOSPHATE ROCK BY THE USE OF SULFUR DIOXIDE, WATER, AND CARBONYL COMPOUNDS

[75] Inventors: John F. McCullough; John F. Phillips, Jr.; Leslie R. Tate, all of Florence, Ala.

[73] Assignee: Tennessee Valley Authority, Muscle Shoals, Ala.

[21] Appl. No.: 779,038

[22] Filed: Mar. 18, 1977

Related U.S. Application Data

[63] Continuation of Ser. No. 730,210, Oct. 6, 1976, now Defensive Publication No. T962,001.

[51] Int. Cl.$^2$ .................... C01B 15/16; C01B 25/26; C01F 1/00
[52] U.S. Cl. .................................. 423/308; 423/311; 423/167; 71/33
[58] Field of Search .................... 423/167, 320, 321 S, 423/305, 307, 308, 311, 319; 71/33

[56] References Cited

U.S. PATENT DOCUMENTS

| 1,137,806 | 5/1915 | Stewart | 423/167 |
|---|---|---|---|
| 1,251,741 | 1/1918 | Blumonberg | 423/167 |
| 1,981,145 | 11/1934 | Keller | 423/321 S |

OTHER PUBLICATIONS

Wilson, The Industrial Potential of SO$_2$-Carbonyl Compound—Water Mixture, Proceedings of the Can Sulfur Symposium, 1974.

*Primary Examiner*—O. R. Vertiz
*Assistant Examiner*—Gregory A. Heller
*Attorney, Agent, or Firm*—Robert A. Petrusek

[57] ABSTRACT

A method of preparing dicalcium phosphate from phosphate rock wherein the rock is treated with a mixture of water, carbonyl, and sulfur dioxide. Solids are separated from the liquid phase. The solid phase consists of a mixture of gangue, and calcium α-hydroxysulfonate. Carbonyl and part of the sulfur dioxide are recovered from the solid by low temperature thermal decomposition. Dicalcium phosphate is precipitated from the liquid phase by partial distilling of SO$_2$. All carbonyl is recovered for recycle.

14 Claims, 1 Drawing Figure

PREPARATION OF DICALCIUM PHOSPHATE FROM
PHOSPHATE ROCK

PREPARATION OF DICALCIUM PHOSPHATE FROM PHOSPHATE ROCK BY THE USE OF SULFUR DIOXIDE, WATER, AND CARBONYL COMPOUNDS

The invention herein described may be manufactured and used by or for the Government for governmental purposes without the payment to us of any royalty therefor.

This application is a continuation of application Ser. No. 730,210, filed Oct. 6, 1976, for PREPARATION OF DICALCIUM PHOSPHATE FROM PHOSPHATE ROCK BY THE USE OF SULFUR DIOXIDE, WATER, AND CARBONYL COMPOUNDS, now Defensive Publication No. T962,001.

Our invention relates to a novel method of converting beneficiated or unbeneficiated apatitic phosphate ore to dicalcium phosphate, substantially free of most of the impurities present in the phosphate ore and eminently suitable for use as a fertilizer or as a feedstock for the production of high quality phosphoric acid, more particularly to the conversion of apatitic phosphate ore to dicalcium phosphate by treatment with sulfur dioxide, water, and a carbonyl-containing material, and still more particularly to the conversion of apatitic phosphate ore to dicalcium phosphate with consumption of essentially the minimum theoretical amount of sulfur dioxide.

Dicalcium phosphate is known to be an effective fertilizer, particularly for direct application and blending (*Superphosphate, Its History, Chemistry and Manufacture*, chapter 7, page 172, U.S. Department of Agriculture, 1964); however, it has not been widely used, in part because no process has heretofore been available for its preparation at a cost competitive with other fertilizer materials. A major reason for its relatively high cost is that existing processes either require excess mineral acids in its preparation or require multiple heating, grinding, and filtration steps, unit operations which, like the use of excess acid, significantly add to manufacturing costs of dicalcium phosphate.

The prior art teaches that phosphate rock can be converted to dicalcium phosphate by acidulating the rock with an excess of mineral acid to dissolve the $P_2O_5$, then neutralizing the excess acid in the separated extract with ammonia, limestone, lime, or other basic material to precipitate dicalcium phosphate.

Phosphate rock is the fertilizer industry's name for beneficiated apatitic phosphate ore. The unbeneficiated ore is commonly called matrix, particularly in the United States. Phosphorus occurs in the matrix and phosphate rock as fluorapatite, $Ca_{10}(PO_4)_6F_2$. Excess acid is defined as that over the theoretical amount needed to directly convert phosphorus in the phosphate rock to dicalcium phosphate. For example, with pure fluorapatite and nitric acid, the amount is defined by equation 1.

$$Ca_{10}(PO_4)_6F_2 + 6HNO_3 \rightarrow 6CaHPO_4 + CaF_2 + 3Ca(NO_3)_2 \quad (1)$$

As noted, one method of manufacturing dicalcium phosphate consists of digesting apatite in excess acid and then neutralizing the extract with a base. In some prior art it is taught to add KCl and/or $KNO_3$ to the extract, prior to neutralization of the excess acid to precipitate $K_2SiF_6$ and thus obtain a dicalcium phosphate product that is lower in fluorine, a desirable property. In other teachings, partial purification is achieved by sequentially neutralizing the acid extract to produce multiple crops of solids. Generally, the earliest crop of solids is most impure, but presumably it could be used in those instances where high quality is not required. Nitric acid, hydrochloric acid, sulfuric acid, and phosphoric acid all have been used as acidulating agents.

Nossen (U.S. Letters Patent No. 2,985,527, for example, treats phosphate rock with nitric acid and then precipitates dicalcium phosphate from the extract with lime, $Ca(OH)_2$. He then evaporates water from the filtrate and calcines the solids at 600° C. to recover nitric acid. Mazgaj et al [*Przemysl Chem.* 41, 639–641 (1963)] deviate slightly from the teachings of Nossem in that they sequentially precipitate dicalcium phosphate from the nitric acid extract with limestone and then recover calcium nitrate from the final filtrate by cooling it to −30° C. They also add potassium chloride to the $HNO_3$ extract to precipitate $K_2SiF_6$ with the first crop of crystals. Others report the use of nitric acid extraction followed by ammonia neutralization. Amanrich (French Pat. No. 1,552,185), for example, uses solvent extraction prior to the ammonia neutralization to prepare a purified product. Geiersberger (German Pat. No. 1,282,620) uses sequential ammonia addition for purification. Also see French Pat. No. 1,528,171. Addition of KCl and/or KNO$_3$ prior to sequential precipitation with ammonia is practiced by Caldwell (U.S. Letters Patent No. 3,266,885). Vollmer (German Pat. No. 924,989) makes no attempt at partial purification, but rather adds the ammonia at once. Still others practice the use of hydrochloric acid extraction followed by neutralization with lime (U.S. Letters Patent No. 3,391,993; *Industrial Chemist* 457, 1957). An examination of prior art shows that the reaction of phosphate rock with sulfuric acid followed by filtration and neutralization of the filtrate with lime or limestone is practiced by still another group of prior-art workers (U.S. Letters Patents 2,948,589 and 3,161,466).

In theory, direct acidulation of phosphate rock requires only half as much acid to produce a unit of available phosphorus as is required for manufacture of monocalcium phosphate, the principal phosphatic ingredient in superphosphates. This principle is illustrated with the following equations:

$$Ca_{10}(PO_4)_6F_2 + 6H_2SO_4 + 3H_2O \rightarrow 3Ca(H_2PO_4)_2 \cdot H_2O + 6CaSO_4 + CaF_2 \quad (2)$$

$$Ca_{10}(PO_4)_6F_2 + 3H_2SO_4 \rightarrow 6CaHPO_4 + 3CaSO_4 + CaF_2 \quad (3)$$

Reaction 2, but not reaction 3, takes place during manufacture of normal superphosphate. The theoretical acidulation ratio for production of normal superphosphate is therefore two moles of sulfuric acid per mole P$_2$O$_5$ in the rock. In practice, more acid is used—about 2.6 moles acid/mole P$_2$O$_5$—because acid consuming side reactions take place between rock impurities and acid [Bridger, G. L., *J. Ag. Food Chem.* 4(4), 331 (1956)].

If dicalcium phosphate could be manufactured according to equation 3, only one mole of acid/mole P$_2$O$_5$ would be required—a considerable saving in the use of acid. Treatment of apatite with this stoichiometric quantity of acid will not, unfortunately, yield dicalcium phosphate. Rather, a mixture of calcium fluoride, monocalcium phosphate and unreacted fluorapatite will exist in equilibrium with a more acidic liquid phase.

Thus, one method of preparing dicalcium phosphate, a method already discussed, requires using excess acid to prepare phosphoric acid. When the phosphoric acid extract is neutralized with base, dicalcium phosphate preferentially precipitates.

To decrease the requirement of excess acid, some prior-art workers leach phosphate rock with excess sulfuric acid then use the leachate to treat more rock. Thus, Boylan et al (U.S. Letters Patent No. 3,427,124) react phosphate rock with 40 percent H$_2$SO$_4$ using a mole ratio H$_2$SO$_4$:P$_2$O$_5$ of 4.8:1. On filtering off the gypsum, they obtain a filtrate of H$_3$PO$_4$ and H$_2$SO$_4$. They use this filtrate to acidulate phosphate rock at ~145° C. using a mole ratio H$_2$SO$_4$:P$_2$O$_5$ of 2.16:1. They filter the reaction mixture hot and obtain a fertilizer product containing dicalcium phosphate, CaHPO$_4$. They fortify the filtrate with additional sulfuric acid for recycle. The product manufactured by this process is contaminated by phosphate rock reaction products, principally gypsum and gangue, but the overall acidulation mole ratio H$_2$SO$_4$:P$_2$O$_5$ is 2.3:1 which is lower than that required in conventional superphosphate manufacture.

Bridger (U.S. Letters Patent No. 3,011,888) shows that dicalcium phosphate may be prepared, without the use of excess acid, by treating phosphate rock with water and phosphoric acid, curing the product (principally monocalcium phosphate and phosphate rock) at room temperature for several days, mixing it with more water and hydrolyzing the monocalcium phosphate to dicalcium phosphate and phosphoric acid at 110° C. to 130° C. under reflux. The temperature is then increased to about 186° C. to concentrate the liberated phosphoric acid and allow it to further react with more phosphate rock. The reaction mixture, now a dry solid, is cooled, ground to −48 mesh, mixed with additional water and reheated to promote further hydrolysis. The heating-cooling sequence can be repeated as often as necessary, but Bridger claims [Bridger, G. L. et al, *J. Ag. Food Chem.* 4(4), 331 (1956)] that adequate conversion is possible with only one or two cycles.

The essence of Bridger's invention is seen in the following reactions. In reaction 4, phosphoric acid converts part of an excess of apatite to monocalcium phosphate.

$$Ca_{10}(PO_4)_6F_2 + 12H_3PO_4 \rightarrow CaF_2 + 9Ca(H_2PO_4)_2 \quad (4)$$

Heating the monocalcium phosphate under reflux hydrolyzes it to dicalcium phosphate and phosphoric acid as shown in equation 5.

$$Ca(H_2PO_4)_2 \xrightarrow{\Delta} CaHPO_4 + H_3PO_4 \quad (5)$$

Further heating the mixture to a higher temperature concentrates the liberated phosphoric acid and promotes further reaction between it and unreacted apatite as in equation 4. The product, a mixture of monocalcium phosphate, dicalcium phosphate and unreacted apatite is cooled, water added, and the cycle repeated.

Bridger's ingenious invention circumvents the problem of using excess acid but the process has never been commercialized, perhaps because it requires numerous unit operations for successful operation.

Prior art shows that α-hydroxysulfonic acids have been used in the paper industry, more particularly in the Pritchard-Fraxon Process [Ali, S. F. et al, Tappi 51(7), 69A (1968); U.S. Letters Patent No. 3,248,278]. At one point in this process, cations are absorbed from the spent sulfite pulping liquor on an ion exchange resin. Because sulfurous acid is not particularly strong or concentrated, it will not efficiently displace absorbed mono- and divalent cations when the resin is regenerated. By a strong acid is meant an acid in which the hydronium ion concentration is large; and by concentration is meant mass of SO$_2$ per unit mass of solution.

The above-mentioned prior art workers circumvent the difficulty of stripping cations from the resin by adding acetone to the sulfurous acid stripping liquor and thereby increase both the acid concentration and strength of the liquor. This improvement occurs through the formation of an α-hydroxysulfonic acid. Formation of this strong acid both increases the sulfur dioxide concentration and the hydronium ion, H$_3$O$^+$, concentration as shown in equation 6.

(6)

This solution with the higher hydronium ion concentration more efficiently strips other cations from the resin.

Wilson (U.S. Letters Patent No. 3,549,319) also teaches that sulfonic acids have other uses in the paper industry. Alkali metal sulfites and ammonium sulfite show advantages over calcium sulfite as pulping agents, but have not gained greater use because they require the use of expensive alkali metal hydroxides or carbonates in their manufacture. Wilson has discovered that these alkali sulfites may now be made directly from various alkali salts through the use of α-hydroxysulfonate intermediates. This discovery is illustrated by the following equations.

He reacts carbonyl such as acetone with sulfur dioxide and water at reduced temperature as shown in equation 6. The sulfonic acid further reacts with an alkali metal salt such as sodium chloride to form the partially soluble sodium α-hydroxysulfonate and hydrochloric acid solution as is shown in equation 7.

Wilson filters off the sodium sulfonate and thermally decomposes it to sodium sulfite, as shown below.

Wilson in a later paper (The Industrial Potential of $SO_2$--Carbonyl Compound—Water Mixtures, Proceedings of the Can. Sulf. Symp. U. Calg., Calg., Alberta, Can., May 30, 1974) elaborates on the use of sulfonic acids in the paper industry and also proposes its use in the preparation of potassium phosphate from potassium chloride. Wilson would, in this proposal, prepare potassium α-hydroxysulfonate from KCl and acetone in a reaction analogous to equation 7. He decomposes the potassium sulfonate with phosphoric acid to potassium phosphate, $SO_2$, acetone and water. Although he shows the formation of $K_3PO_4$, it is more likely that $KH_2PO_4$ would form. He further proposes that the KCl-contaminated dilute hydrochloric acid coproduct be used to make phosphoric acid from phosphate rock by known procedures. The only known processes for preparing phosphoric acid from phosphate rock and hydrochloric acid involve the separation of phosphoric acid from the acidulate by solvent extraction ("Phosphoric Acid, Vol. 1, Part II," A. V. Slack, ed., page 889, Marcel Dekker, Inc., New York - 1968).

The hydrochloric acid coproduct concentration would, in the examples cited by Wilson et al (U.S. Letters Patent No. 3,549,319) range from 2.0 to 3.4 M. Although sufficiently concentrated to dissolve phosphate rock, it would yield a product solution too dilute for economical application of solvent extraction procedures. A second serious objection to this proposal is the fact that 12.5 percent or more of the valuable potassium chloride is irrevocably lost to waste during solvent extraction.

In his 1974 paper, supra, Wilson briefly mentioned his study of the solubility of various sulfide and nonsulfide minerals in acetone sulfonic acid solution. He noted that several sulfides were partially soluble in a 70 percent acetone — 10 percent $SO_2$ — 20 percent water mixture and suggested that this discovery might be applied to ion exchange recovery of copper from dilute copper solutions.

It is an object of the present invention to convert beneficiated and unbeneficiated apatitic phosphate ore to dicalcium phosphate substantially free of most of the impurities in the phosphate ore and suitable for use as a fertilizer or as a feedstock for preparation of high-quality phosphoric acid (Chem. and Eng. News, page 32, Sep. 6, 1976).

Another object of the present invention is to convert apatitic phosphate ore to dicalcium phosphate with consumption of only the stoichiometric amount of sulfur dioxide.

We have overcome the aforementioned disadvantages of manufacturing dicalcium phosphate by treating phosphate rock at ambient temperature with a mixture of sulfur dioxide, water, and either an aldehyde or ketone, hereafter known as a carbonyl, to yield an easily filterable reaction mixture consisting of gangue, solid calcium α-hydroxysulfonate and calcium phosphate dissolved in the water-$SO_2$-carbonyl solvent. Filtration of this mixture yields a solution of calcium phosphate which is less contaminated with fluorine and metallic impurities and a solid consisting of gangue, phosphate rock impurities and a calcium α-hydroxysulfonate. Fractional distillation of part of the sulfur dioxide from the filtrate precipitates anhydrous dicalcium phosphate in high yield. By distilling only part of the sulfur dioxide from the filtrate, calcium in excess over that required to precipitate dicalcium phosphate remains in solution as calcium bisulfite to be recycled to the process and ultimately rejected from the system in the filter cake. All of the carbonyl and one-half of the sulfur dioxide in the filter cake are recovered for recycle by mild heating. By recycling the distillates and filtrates, all carbonyl is recovered, and the net conversion reaction becomes The sulfur dioxide consumed is equal to 1.0 mole $SO_2$/mole $P_2O_5$.

Some sulfite oxidation may occur during the process but this presents no problem since the oxidation product, gypsum, is insoluble and therefore removed from the system with the calcium sulfonate filter cake.

[Raschig and Prahl Ann. 448, 265-312 (1926)] first discussed the interaction of aldehydes and ketones with bisulfites in some detail. Stewart and Donnally [J. Am. Chem. Soc. 54, 2333 (1932)] and Lauer and Langkammerer [J. Am. Chem. Soc. 57, 2360 (1935)] correctly showed that the formation of these carbonyl bisulfite addition compounds is reversible and that the compounds are α-hydroxysulfonates having the following structure where R represents an alkyl group and R' represents either a hydrogen atom or an alkyl group.

The basic reaction in the formation of an α-hydroxysulfonic acid is the following The reaction is reversible and readily shifted to the left by an increase in temperature. In effect, use of a carbonyl compound, such as acetone, cyclohexanone or benzaldehyde, transforms the weak sulfurous acid into a much stronger α-hydroxysulfonic acid which may be decomposed back to its constituents at higher temperature. Because increased temperature shifts the reaction back to the left, the acid concentration may be controlled easily by temperature variation and carbonyl concentration. Although the formation of α-hydroxysulfonic acids is quite general for both aldehydes and ketones, there is wide variation in both the rate of their formation and thermal stability (Gilbert, "Sulfonation and Related Reactions," page 159, Interscience Publishers, 1965). The variation in thermal stability and strength of aliphatic α-hydroxysulfonic acids is best explained by steric factors. Aldehydes, in general, yield more stable sulfonic acids than ketones. Among ketone sulfonic acids, stability decreases as the size of the alkyl group adjacent to the carbonyl group is increased. Because of these steric factors, acetone and cyclohexanone form two of the strongest ketone derived α-hydroxysulfonic acids.

As with any strong acid, these sulfonic acids readily react with apatite to form the calcium salt and water. The calcium salts of α-hydroxysulfonic acids are generally quite soluble in water but become progressively less soluble as the concentration of the parent carbonyl is increased. Bulky alkyl groups on the carbonyl also tend to decrease the solubility of the carbonyl salt. Because of the progressive decrease in sulfonate salt solubility with increased carbonyl concentration, the salt solubility may be controlled easily.

The thermal stability of calcium α-hydroxysulfonate salts appears to follow the stability trend of the parent acid in that stronger acids yield more stable salts. However, even the most stable of these salts usually are readily decomposed by mild heating (100°–200° C.) as shown below.

An advantage of our process over the previously discussed prior art is that excess acid is not used to leach phosphate rock only to be neutralized at a later step with ammonia or calcium containing basic compounds. In our invention, calcium in the rock supplies all calcium required for dicalcium phosphate and no excess acid is consumed. A further advantage of the present invention is that only phosphate rock and sulfur dioxide are consumed in the process. Another advantage is that the ratio of fluorine and metallic impurities to $P_2O_5$ in the dicalcium phosphate product is substantially lower than that in the phosphate ore. Because of this decontamination or purification, the product would be suitable for production of liquid fertilizer without additional purification. An additional advantage of the present invention is that anhydrous dicalcium phosphate is precipitated in high yield from the reaction mixture filtrate by distilling part of the sulfur dioxide. This is totally unexpected and novel because in the presence of excess calcium, octacalcium phosphate or hydroxyapatite would be expected to precipitate. Because these latter materials contain a lower percentage of phosphate and are not readily available for plant uptake, they are less desirable as fertilizer products. A still further advantage of the present invention is that the final product is a highly concentrated free-flowing material which is easily filtered. A still further advantage of the present invention is that low temperature operation results in less corrosion to process equipment and minimizes the evolution of environmentally objectionable fluorine compounds. The use of relatively inexpensive sulfur dioxide (compared to sulfuric or other mineral acids) as an acidulating agent is also advantageous.

The ability to control the strength of the acid by variation in carbonyl concentration and temperature is quite useful because it allows us to selectively leach the apatite from the phosphate rock and leave deleterious clays and iron-aluminum minerals in the filter cake.

Still further and more general advantages and objects of the present invention will appear from the detailed description given below, it being understood, however, that this more detailed description is given by way of illustration only and not necessarily by way of limitation, since various changes therein may be made by those skilled in the art without departing from the scope and spirit of our invention.

The detailed description of our invention refers specifically to the use of acetone as the carbonyl. But it is understood that with minor changes in such operating conditions as temperature and carbonyl concentration, the present invention operates equally well when used with other carbonyl compounds.

In carrying out the objectives of our invention, phosphate concentrate or phosphate matrix is digested with a mixture of sulfur dioxide, water, and acetone, causing decomposition of the phosphate ore and dissolution of phosphorus values and some calcium. The phosphate rock or matrix need not be dried prior to its use. Reaction time, reaction temperature, and acetone:water weight ratio may be varied within rather wide limits. From 80 to 100 percent of the phosphorus is extracted from rock after two to five hours treatment with a weight ratio acetone:water of 0.75 saturated with sulfur dioxide in the temperature range of 13° to 35° C. Under these operating conditions, 13 to 70 percent of the iron, 15 to 50 percent of the fluorine, and 11 to 60 percent of the aluminum is liberated from a phosphate rock concentrate. The process works equally well when the weight ratio acetone:water is varied between the range of 0.6 to 1.0. Use of higher temperature or a weight ratio acetone:water outside the above cited limits decreases the reaction rate, but this may be compensated for by using slightly longer reaction times. The order in which the reactants are mixed is not important and in a continuous process, they would be mixed simultaneously.

In general, there is an optimum weight ratio acetone:water to maximize rock decomposition rate at various operating temperatures, but the weight ratio carbonyl:water may deviate from this optimum without decreasing the effectiveness of our invention.

The time required to liberate the $P_2O_5$ from the rock depends on the weight ratio of calcium in the rock to acetone-water solvent used in the reaction. Use of higher ratios yields more concentrated filtrates, a distinct advantage, but it requires a longer period of time to completely liberate the $P_2O_5$ from the rock. The optimum ratio depends on a compromise between the advantages of a more concentrated reaction mixture filtrate and a shorter reaction time. Satisfactory results were obtained when the ratio calcium: solvent varied between 8 and 12 grams calcium/100 g solvent but the ratio may deviate from this range without decreasing the effectiveness of the invention.

In the operation of the invention, it is convenient to maintain the reaction mixture saturated with sulfur dioxide, but this is not a necessary requirement for successful operation.

The solubility of the calcium and metallic impurities which are liberated will depend on the temperature, type of carbonyl, carbonyl:water ratio and rock source but under the conditions of our invention part of the impurities and some calcium are converted to insoluble forms which filter rapidly and thus permit conventional filtration to be used to separate the solids from the phosphorus enriched filtrate.

The solid portion of the reaction mixture is primarily a mixture of calcium α-hydroxysulfonate of acetone, other metallic sulfonates, calcium fluoride, and gangue. The calcium and other metallic sulfonates in the filter cake are easily decomposed by mild heating. The calcium acetone sulfonate, more correctly known as calcium 2-hydroxy-2-propanesulfonate monohydrate, decomposes to calcium sulfite hemihydrate in less than 18 hours at room temperature, via equation 12

$$Ca[(CH_3)_2C(OH)SO_3]_2 \cdot H_2O \xrightarrow{\Delta} CaSO_3 \cdot 0.5H_2O + SO_2 + 3/2\ H_2O + 2CH_3COCH_3 \quad (12)$$

or in less than 1 hour at 100° C.

To recover phosphorus values from the reaction mixture filtrate, part of the sulfur dioxide and a small amount of acetone are fractionally distilled from the filtrate until the distillate temperature reaches 55° C. The high quality anhydrous dicalcium phosphate is filtered off and the filtrate returned to the process. By using dry phosphate rock, all filtrate is recycled and only a small amount of makeup water would be required to compensate for water carried off as the $CaSO_3 \cdot 0.5H_2O$ waste; however, it is not a requirement that the rock be dry since water can be added to the system.

Calcium, in stoichiometric excess over that required to form dicalcium phosphate, may be present in the reaction mixture filtrate. By halting the distillation at 55° C., enough sulfur dioxide remains in solution to prevent precipitation of both the excess calcium and metallic phosphate rock impurities carried into the filtrate. These impurities and excess calcium will be returned to the process in the distillation filtrate but will ultimately be rejected with the calcium sulfonate filter cake. Thus, there is decontamination of the phosphorus both at the phosphate rock attack stage and in the dicalcium phosphate precipitation stage.

The use of partially dried rock may add excess water to the process. To maintain the water balance, this excess water can be conveniently removed from the process by further treatment of a side stream of the distillation filtrate. One such treatment consists of distilling and recycling the remaining acetone and $SO_2$ in the sidestream. Calcium sulfite hemihydrate and metallic impurities precipitate and are filtered off leaving a filtrate which is essentially water. Depending on economics, the calcium sulfite is discarded or thermally decomposed to quick lime and $SO_2$ for recycle.

Our invention will be better understood from a consideration of additional description in connection with the diagrams of the FIGURE, which is a flowsheet illustrating the principles of our invention.

Figure 1:
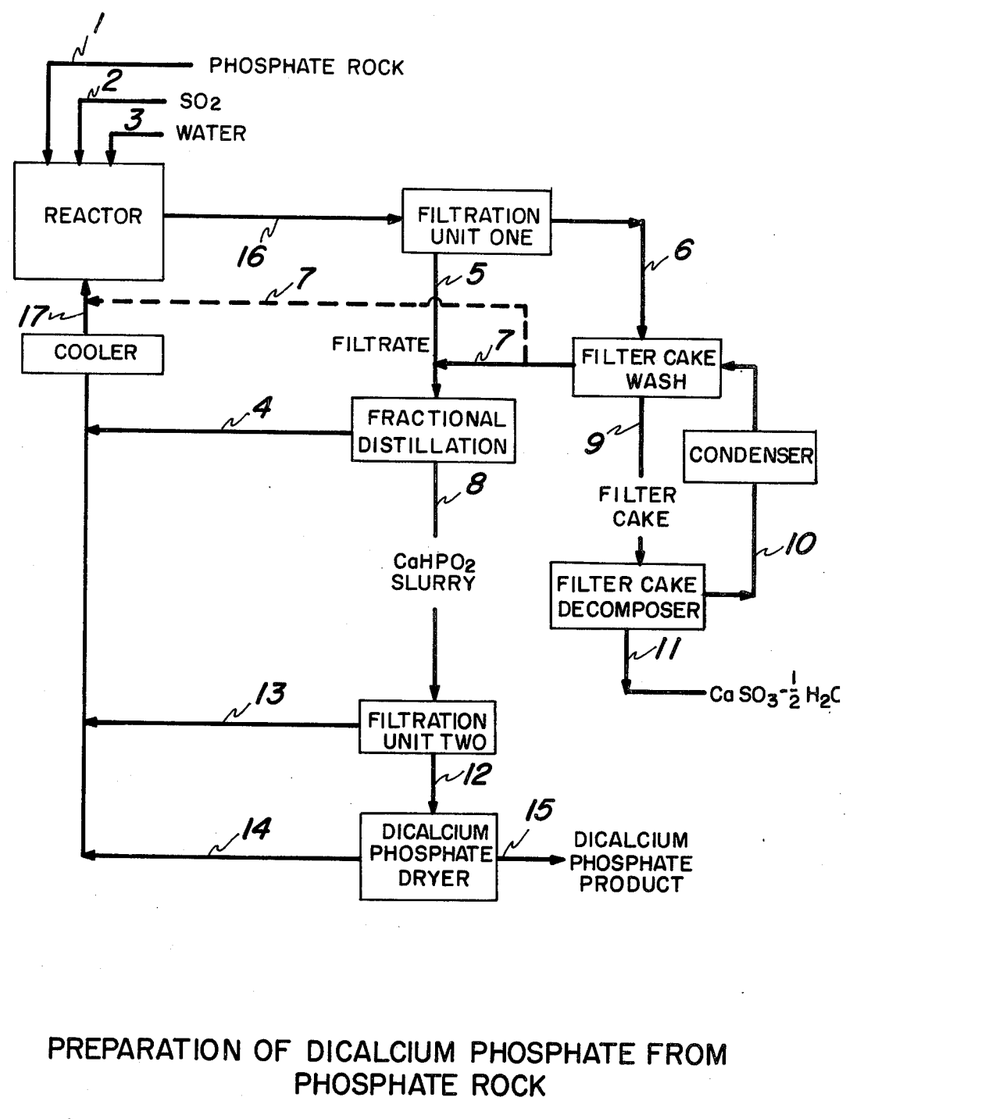

Referring now more specifically to the FIGURE, phosphate rock from a source not shown is fed through line 1 into the reactor. Water, acetone, and sulfur dioxide are returned to the reactor through lines 4, 13, and 14 from portions of the process later described. Makeup sulfur dioxide and water, if necessary, are added to the reactor via lines 2 and 3. The reactor is equipped with a motor-driven agitator running at such speed as to secure rapid and intimate mixing of rock, water, carbonyl, and sulfur dioxide. Reaction time required to completely liberate the phosphorus from the rock is variable and will depend on rock and rock charge and reaction temperature with higher decomposition rates occurring at lower temperatures.

Following digestion, the reaction mixture is fed via line 16 to filtration unit 1 where liquids are separated from solids by filtration. Additional phosphorus values, lightly adhering to the solids of line 6 are washed free with an acetone, $SO_2$, water mixture, and combined with the filtrate from line 5, via line 7, or sent directly back to the reactor (broken line). Any source of wash liquor may be used but a convenient one may be had by condensing off-gas from the filter cake decomposers, line 10. The washed solids, now almost free of phosphate values, consist primarily of metal sulfonates, metal oxides, gangue, and calcium fluoride. All acetone and one-half the sulfur dioxide in the metal sulfonate cake is recovered for recycle from the cake by heating it for 60 minutes in a stream of nitrogen at 100° C. Following heating, the solids are discarded via line 11.

The phosphorus enriched filtrate from filtration unit one, line 5, is used alone or combined with the filter cake wash, line 7, and led to a fractional distillation unit where, on distillation of part of the $SO_2$ and a small amount of acetone, anhydrous dicalcium phosphate precipitates in an easily filterable form.

The dicalcium phosphate slurry is fed via line 8, to filtration unit 2 where anhydrous dicalcium phosphate is filtered, hot, from the undistilled liquid. The filtrate is recycled to the process via line 13 and the solid dicalcium phosphate is sent to a dryer, via line 12, where residual acetone, water, and $SO_2$ is removed from the solid. The phosphate product is removed for shipment or use via line 15 and the $SO_2$—$H_2O$—acetone recycled to the process via line 14. Prior to returning to the reactor, the recycled liquors, line 17, are cooled to room temperature.

In order that those skilled in the art might better understand how the present invention can be practiced the following examples are given by way of illustration.

EXAMPLE I

A mixture of 85.7 g of acetone and 114.3 g water was saturated with sulfur dioxide at 13° C. A 41.41 g portion of North Florida phosphate rock concentrate containing 13.45 g $P_2O_5$ was added to this mixture and vigorously stirred for 4 hours at 13° C. The composition of this phosphate rock was as follows:

| North Florida Phosphate Rock Concentrate | |
|---|---|
| Species | Composition, wt % |
| $P_2O_5$ | 32.48 |
| Calcium | 34.3 |
| Aluminum | 0.82 |
| Iron | 0.51 |
| Fluorine | 4.0 |
| Apatite | 88.5 |

The reaction mixture was kept saturated with $SO_2$ during the reaction. Following the 4-hour treatment, the mixture was warmed to 30° C. and stirred for an additional 30 minutes, then filtered through a 300-mesh cloth to yield a clear yellow filtrate and light brown filter cake.

The filter cake was washed with 25 g of a 4-percent water in acetone solution saturated with $SO_2$.

The filtrate contained 10.72 g $P_2O_5$ (79.7 percent of input) and 7.18 g of calcium (50.6 percent of input). The filter cake wash liquor contained an additional 2.17 g of $P_2O_5$ (16.1 percent of input) and 1.74 g of calcium (12.3 percent of input). Thus, the combined filtrate and wash solution contained a total of 12.89 g of $P_2O_5$ (95.8 percent of input). From chemical analysis of the washed filter cake, it was found that the combined filtrate and wash liquor contained 0.10 g of aluminum (30 percent of input), 0.15 g of iron (71.0 percent of input) and 0.32 g of fluorine (19.3 percent of input).

A portion of the reaction mixture filtrate containing 8.42 g of $P_2O_5$ was fractionally distilled to 55° C. head temperature causing precipitation of 17.67 g of solid, identified by infrared and petrographic analysis to be largely anhydrous dicalcium phosphate with a small amount of calcium sulfite hemihydrate. The solids contained 8.18 g of $P_2O_5$ (97.1 percent of input $P_2O_5$) and had an analysis of 46.3 percent $P_2O_5$ and 27.4 percent calcium.

After filtering the dicalcium phosphate precipitate off, the filtrate was distilled further until the distillate temperature reached 95° C. A second quantity of solid precipitated which contained 30.7 percent calcium and 7.74 percent $P_2O_5$. Infrared analysis showed it to be $CaSO_3.0.5H_2O$ admixed with a small amount of $CaHPO_4$. The remaining filtrate contained less than 0.01 percent of the input calcium and $P_2O_5$.

EXAMPLE II

A mixture of 85.7 g of acetone and 114.3 g water was saturated with sulfur dioxide at 25° C. A 46.36 g portion of uncalcined North Carolina phosphate rock concentrate containing 13.84 g of $P_2O_5$ was added to the mixture and vigorously stirred for 2 hours at 25° C. The composition of this phosphate rock concentrate was as follows:

| North Carolina Phosphate Rock Concentrate | |
|---|---|
| Species | Composition, wt % |
| $P_2O_5$ | 29.85 |
| Calcium | 34.6 |
| Aluminum | 0.26 |
| Iron | 0.47 |
| Fluorine | 3.5 |
| Magnesium | 0.34 |
| Apatite | 86.7 |

The reaction mixture was kept saturated with $SO_2$ during the reaction. Following the 2-hour treatment, the mixture was warmed to 35° C. for 0.5 hour, then filtered through a 300-mesh cloth to yield a clear brown filtrate and black filter cake.

The filter cake was washed with a liquid mixture containing 38.5 g of water and 11.5 g of acetone saturated with sulfur dioxide.

The filtrate contained 11.36 g of $P_2O_5$ (82.0 percent of input) and 8.78 g of calcium (54.7 percent of input). The filter cake wash liquid contained an additional 2.17 g of $P_2O_5$ (15.7 percent of input) and 2.79 g of calcium (17.4 percent of input). The combined yield of $P_2O_5$ in the filtrate and wash liquor was 13.53 g, which was 97.8 percent of the input $P_2O_5$.

A portion of the filtrate containing 7.38 g of $P_2O_5$ and 5.63 g of calcium was fractionally distilled to 55° C. head temperature causing 7.08 g of $P_2O_5$ (95.9 percent of input) and 4.00 g of calcium (71.0 percent of input) to precipitate in a solid identified as largely anhydrous dicalcium phosphate and having the following analysis:

| Species | Composition, wt % |
|---|---|
| $P_2O_5$ | 50.1 |
| Sulfite Sulfur | 0.6 |
| Calcium | 28.3 |
| Magnesium | 0.006 |
| Iron | 0.14 |
| Aluminum | 0.05 |
| Fluorine | 0.79 |

Based on these analyses, the precipitated solid contains 96.0 percent anhydrous dicalcium phosphate. The percents of input of iron, aluminum, magnesium, and fluorine (based on the rock analysis) which were in the dicalcium phosphate product are as follows:

| Species | Wt % of input |
|---|---|
| Magnesium | 0.8 |
| Iron | 13 |
| Aluminum | 8.1 |
| Fluorine | 9.7 |

EXAMPLE III

A mixture of 42.86 g of acetone and 57.14 g of water was saturated with $SO_2$ at 25° C., then used to attack 20.37 g of Idaho phosphate rock concentrate for 2.06 hours at 25° C. The composition of this phosphate rock was as follows:

| Idaho Phosphate Rock Concentrate | |
|---|---|
| Species | Concentration, wt % |
| $P_2O_5$ | 32.16 |
| Calcium | 33.5 |
| Iron | 0.34 |
| Aluminum | 0.56 |
| Fluorine | 3.4 |
| Apatite | 83.3 |

Following the reaction, the mixture was filtered and the filter cake washed with 25 g of acetone saturated with $SO_2$ at 25° C. The filtrate contained 5.71 g of the 6.551 g of $P_2O_5$ originally in the rock (87.2 percent yield) and the wash liquor contained an additional 0.59 g (9 percent) making a total yield of 6.30 g (96.2 percent of input).

Analyses of the washed filter cake showed that the combined filtrate and wash liquor contained 0.067 g of aluminum (58.8 percent of input), 0.041 g of iron (59.2 percent of input) and 0.37 g of fluorine (53.4 percent of input).

EXAMPLE IV

A mixture of 37.50 g acetone and 62.5 g water was saturated with sulfur dioxide at 25° C., then used to attack 25.32 g of Utah phosphate rock concentrate for 5.0 hours. The composition of this rock was as follows:

| Utah Phosphate Rock Concentrate | |
|---|---|
| Species | Concentration, wt % |
| $P_2O_5$ | 34.70 |
| Calcium | 33.3 |
| Iron | 1.3 |
| Aluminum | 0.53 |
| Fluorine | 3.6 |

The reaction mixture was treated as in example III. The filtrate contained 6.31 g of the 8.786 g of $P_2O_5$ originally in the concentrate (71.8 percent of input) and the wash liquor contained an additional 1.52 g (17.3 percent of input) making a total yield of 7.83 g (89.1 percent of input $P_2O_5$).

The combined filtrate and wash liquor contained 4.8 g of calcium (56.9 percent of input, 0.042 g of iron (12.7 percent of input), 0.017 g of aluminum (12.7 percent of input) and 0.29 g of fluorine (31.8 percent of input).

EXAMPLE V

A mixture of 102.56 g water and 97.44 g acetone was saturated with $SO_2$ and allowed to react with 60.00 g of Central Florida phosphate rock concentrate for 12 hours at 19° C., then heated to 35° C. for 2.5 hours. The composition of the phosphate rock concentrate was as follows:

| Central Florida Phosphate Rock Concentrate | |
|---|---|
| Species | Concentration, wt % |
| $P_2O_5$ | 32.4 |
| Calcium | 34.0 |
| Aluminum | 0.74 |
| Iron | 0.99 |
| Fluorine | 3.8 |
| Apatite | 87.9 |

The mixture was treated as in example III, supra, except that 98 g of acetone saturated with $SO_2$ was used to wash the filter cake. The filtrate contained 11.91 g of the 19.44 g of $P_2O_5$ originally in the rock (61.3 percent of input) and the wash liquor contained an additional 6.18 g (31.8 percent of input) making a total yield of 18.09 g of $P_2O_5$ (93.1 percent).

EXAMPLE VI

A mixture of 85.71 g of acetone and 114.29 g water was saturated with sulfur dioxide, then mixed with 53.74 g of the North Carolina phosphate rock used in example II, supra, for 2.0 hours at 25° C. The mixture was kept saturated with $SO_2$ throughout the reaction. Following the 2-hour reaction, the temperature was increased to 30° C. for 30 minutes, then filtered. The black filter cake was washed with a mixture of 12.5 g of water and 37.5 g of acetone saturated with $SO_2$ at 30° C. The filtrate contained 10.2 g of the 16.04 g of $P_2O_5$ in the rock while the wash solution contained an additional 3.03 g of $P_2O_5$ giving a combined yield of 13.2 g of $P_2O_5$ (82.5 percent of input). The combined filtrate and wash solutions contained 7.56 g of calcium (40.7 percent of input), 0.075 g of iron (30 percent of input), less than 0.02 g of aluminum (< 14 percent of input) and 0.129 g of magnesium (71 percent of input).

Portions of the filtrate and wash solutions were combined to yield a mixture containing 12.2 g of $P_2O_5$. (About 10 percent of the reaction mixture filtrate and wash solution were reserved for analysis). This mixture was fractionally distilled until the distillate temperature reached 57° C. The precipitate was filtered, washed with 50 g of water and air dried. The precipitate weighed 25.57 g and contained 11.99 g of $P_2O_5$ (98.3 percent yield).

EXAMPLE VII

A mixture of 19.6 g cyclohexanone and 130.4 g of water was saturated with sulfur dioxide at 20° C. A 10.00 g portion of the Central Florida phosphate rock concentrate used in example V was allowed to react with the solution for 1.5 hours. The mixture was vigorously agitated at all times and kept saturated with sulfur dioxide.

At the end of 1.5 hours, the mixture was filtered to yield a yellow filtrate and brown solid. The filtrate contained 3.00 g of the 3.24 g of $P_2O_5$ initially in the rock (92.6 percent of input) and 3.18 g of the 3.4 g of calcium initially in the rock (93.5 percent of input).

EXAMPLE VIII

A mixture of 34.6 g of cyclohexanone and 115.4 g water was saturated with $SO_2$ at 25° C. A 13.00 g sample of the Central Florida phosphate rock used in example V was treated with this mixture for 1.0 hour, then filtered. The yellow filtrate contained 3.29 g of the 4.21 g of $P_2O_5$ originally in the rock (78.1 percent of input) and 1.50 g of the original 4.42 g of calcium in the rock (33.9 percent of input).

EXAMPLE IX

A mixture of 32.98 g of cyclohexanone and 67.02 g of water was saturated with sulfur dioxide at 25° C. A 25.88 g portion of dried pulverized Central Florida phosphate matrix was treated with this mixture for 3.5 hours, then filtered. Prior to treatment, the matrix was dried overnight at 105° C., then ground to minus 50 mesh. Chemical analysis of the matrix was as follows:

| Central Florida Phosphate Rock Matrix | |
|---|---|
| Species | Concentration, wt % |
| $P_2O_5$ | 12.8 |
| Calcium | 14.0 |
| Iron | 1.1 |
| Aluminum | 1.6 |
| Magnesium | 0.28 |
| Fluorine | 1.6 |
| Carbon dioxide | 2.1 |
| Potassium oxide | 0.23 |
| Sodium oxide | 0.35 |
| Acid insoluble | 55.6 |

The reaction mixture filtered well, yielding a clear yellow filtrate and a bulky tan precipitate. The filtrate contained 1.8 g of the 3.31 g of $P_2O_5$ in the matrix (54.3 percent yield). Also, in the filtrate were 0.308 g of calcium (8.5 percent of input), 0.0504 g aluminum (12.2 percent of input), 0.039 g iron (13.7 percent of input), 0.202 g fluorine (48.8 percent of input), and 0.028 g magnesium (38.6 percent of input).

When the filter cake was washed with 50 g of cyclohexanone saturated with sulfur dioxide, the wash liquor contained an additional 0.51 g of $P_2O_5$ (15.4 percent of input) giving a combined yield in the filtrate and filter cake wash liquor of 2.31 g of $P_2O_5$ (69.8 percent of total).

EXAMPLE X

An 11.72 g sample of washed filter cake solid, consisting primarily of calcium 2-hydroxy-2-propanesulfonate and gangue, was heated for 60 minutes at 95° C. resulting in a weight loss of 6.16 g (52.6 percent). Petrographic analysis showed that all the calcium sulfonate salt had been converted to calcium sulfite hemihydrate.

EXAMPLE XI

To identify the products evolved on heating, the reaction of example X was repeated under reduced pressure and the evolved gases collected in a dry ice trap. Gas chromatographic analysis of the condensate showed it to be a mixture of acetone and sulfur dioxide in a 2:1 mole ratio indicating the calcium sulfonate decomposed as follows:

(13)

EXAMPLE XII

Pure calcium 2-hydroxy-2-propanesulfonate monohydrate was prepared by reacting 40 g of calcium carbonate with 114 g of water, 86 g of acetone and excess sulfur dioxide for 3 hours at 25° C. The reaction mixture was filtered, and the white solids washed with 50 ml of acetone, then with ether, then air dried for 30 minutes and chemically analyzed. Calculated for $Ca[(CH_3)_2C(OH)SO_3]_2 \cdot H_2O$: Ca 11.9 percent, C 21.4 percent, H 4.8 percent, S 19.1 percent; observed: Ca 12.2 percent, C 21.0 percent, H 4.3 percent, S 18.8 percent.

A sample of this material which was heated in an open container for 72 hours at 90° C., experienced a 60-percent weight loss. Calculated loss for decomposition by equation 4 is 61.6 percent weight loss. A sample heated in an open container at 200° C. for 1.25 hour also experienced a 60-percent weight loss. Solids resulting from both treatments were identified petrographically principally as $CaSO_3 \cdot 0.5H_2O$. X.ray analysis showed a minor amount of $CaSO_4 \cdot 0.5H_2O$ to be present in the sample heated to 90° C. Only a very minor amount of $CaSO_4 \cdot 0.5H_2O$ was found in the sample heated to 200° C., the bulk being $CaSO_3 \cdot 0.5H_2O$.

EXAMPLE XIII

Pure calcium 1-hydroxy-1-cyclohexanesulfonate hexahydrate was prepared by mixing 15 g of calcium carbonate (0.15 mole) with 100 g of 50 weight percent mixture of cyclohexanone in water. Sulfur dioxide was passed into the mixture until the pH was less than 0.5. The mixture was filtered, the cake washed with 100 g of methanol, then air dried and chemically analyzed. Calculated for $Ca[C_6H_{10}(OH)SO_3]_2 \cdot 6H_2O$: Ca 7.9 percent, S 11.6 percent, C 28.3 percent, H 6.4 percent. Observed: Ca 7.9 percent, S 12.6 percent, C 28.5 percent, H 6.7 percent.

Thermal decomposition of calcium 1-hydroxy-1-cyclohexanesulfonate was investigated by heating 0.1796 g of the salt on a thermogravimetric balance at a rate of 8° C./minute in a stream of air. Decomposition (weight loss) begain at 100° C. and was complete at 185° C. The salt lost 0.117 g of weight, which is 87.3 percent of theoretical weight loss calculated from equation 14.

(14)

The small amount of air oxidation of calcium sulfite to gypsum and hemihydrate, which is known to occur, accounts for the difference between the theoretical and observed weight loss.

EXAMPLE XIV

A mixture of 28.90 g of the North Carolina phosphate rock concentrate used in example II, 66.67 g of benzaldehyde and 133.33 g of water was treated with sulfur dioxide at saturation for 5 hours at 25° C. with stirring, then filtered. The filter cake was washed with two 50-ml portions of acetone, then air dried to yield 22.4 g. Analysis of this filter cake showed that the combined filtrate and acetone wash liquor contained 7.00 g of calcium (70 percent of input), 8.13 g of $P_2O_5$ (94 percent of input), 0.35 g of fluorine (35 percent of input), 0.064 g of iron (46 percent of input), and 0.003 g of aluminum (4 percent of input).

EXAMPLE XV

To 200 g of formalin (37.5 percent formaldehyde) was added $SO_2$ until the pH fell below zero, then 25 g of the North Carolina phosphate concentrate used in example II was added. This was allowed to react for 3 hours at 25° C. with stirring, and $SO_2$ saturation maintained. The mixture was filtered and the cake washed with 25 g $H_2O$ and 100 ml acetone, than air dried. The cake weighed 1.91 g and contained calcium 0.21 g (98 percent dissolution) and $P_2O_5$ 0.008 g (99.9 percent dissolution).

EXAMPLE XVI

A solution having a weight ratio acetone:water of 0.80 will, when saturated at 25° C. with $SO_2$, contain 20.7 percent by weight of $SO_2$. To a mixture of 88.88 g acetone and 111.12 g $H_2O$ at 25° C. was added 37.2 g $SO_2$ to give a solution containing 15.7 percent $SO_2$ and having a weight ratio acetone:water of 0.8. To this solution 96.24 g of the North Carolina phosphate concentrate used in example II was added and the mixture allowed to react for 3 hours at 25° C. without further $SO_2$ addition. The mixture was then filtered and the cake dried without prior washing. The cake weighed 21.00 g and contained 6.17 g of calcium (61.4 percent dissolution) and 4.89 g of $P_2O_5$ (64.5 percent dissolution). Based on analysis of nonavailable $P_2O_5$ in the cake, 80 percent of the apatite in the rock was decomposed during the reaction.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. A process for preparing dicalcium phosphate from beneficiated or unbeneficiated phosphate ore or mixtures thereof by use of sulfur dioxide, water, and an organic carbonyl compound, which comprises the steps of:

1. mixing said phosphate ore with a mixture of sulfur dioxide, water, and organic carbonyl compound while maintaining the temperature of the resulting reaction slurry below 50° C. for a period of time from about 0.5 to about 10 hours;
2. separating the solids from the liquid in said reaction slurry from step 1 supra;
3. washing said solids from step 2 supra with a wash mixture comprising sulfur dioxide, water, and organic carbonyl compound, said organic carbonyl compound selected from the group consisting of aldehydes, methyl alkyl ketones, cycloketones, and mixtures thereof to recover phosphate values;
4. recycling phosphate containing wash effluent from step 3 supra to step 1 supra;
5. heating washed solids from step 3 supra to recover organic carbonyl compound and sulfur dioxide;
6. recycling recovered organic carbonyl compound and sulfur dioxide from step 5 supra to step 1, supra;
7. distilling sulfur dioxide from the liquid separated from said reaction slurry in step 2 supra to precipitate dicalcium phosphate;
8. separating said dicalcium phosphate from liquid as product; and
9. recycling the liquid from step 8 supra to step 1 supra.

2. The process of claim 1 wherein step 4 thereof said wash effluent from step 3 is combined with liquid separated from reaction slurry in step 2.

3. A process for preparing dicalcium phosphate from beneficiated or unbeneficiated phosphate ore or mixtures thereof by use of sulfur dioxide, water, and acetone, which comprises the steps of:

1. mixing said phosphate ore with a mixture of sulfur dioxide, water, and acetone while maintaining the temperature of the resulting reaction slurry below 50° C. for a period of time from about 0.5 to about 10 hours, wherein for each mole of calcium in said phosphate ore, 1.9 to 13.0 moles of acetone, 4.7 to 100 moles of water, and 0.7 moles to saturation values of sulfur dioxide are used;
2. separating the solids from the liquid in said reaction slurry from step 1 supra;
3. washing said solids from step 2 supra with a wash mixture composed of sulfur dioxide, water, and acetone to recover phosphate values, wherein for each pound of water in the wash mixture, 3 to 24 pounds of acetone and zero to saturation values of sulfur dioxide are used;
4. recycling phosphate containing wash effluent from step 3 supra to step 1 supra;
5. heating washed solids from step 3 supra for 15 to 75 minutes at temperatures from 90° to 200° C. to recover acetone and sulfur dioxide;
6. recycling recovered acetone and sulfur dioxide from step 5 supra to step 1 supra;
7. distilling sulfur dioxide from the liquid separated from said reaction slurry in step 2 supra to precipitate dicalcium phosphate;
8. separating said dicalcium phosphate from liquid as product; and
9. recycling the liquid from step 8 supra to step 1 supra.

4. The process of claim 3 wherein step 4 thereof said wash effluent from step 3 is combined with liquid separated from reaction slurry in step 2.

5. A process according to claim 3 wherein the temperature of the resulting reaction slurry is maintained below 35° C. for a period of time from about 1 to about 10 hours, wherein for each mole of calcium in said phosphate ore, 3.1 to 4.5 moles of acetone and 11.0 to 18.6 moles of water are used, and wherein the reaction slurry is kept saturated with sulfur dioxide.

6. A process for preparing dicalcium phosphate from beneficiated or unbeneficiated phosphate ore or mixtures thereof by use of sulfur dioxide, water, and cyclohexanone, which comprises the steps of:

1. mixing said phosphate ore with a mixture of sulfur dioxide, water, and cyclohexanone while maintaining the temperature of the resulting reaction slurry below 50° C. for a period of time from about 0.5 to about 10 hours, wherein for each mole of calcium in said phosphate ore, 1.9 to 5.0 moles of cyclohexanone and 17.0 to 180.0 moles of water and 0.7 moles to saturation values of sulfur dioxide are used;
2. separating the solids from the liquid in said reaction slurry from step 1 supra;
3. washing said solids from step 2 supra with a wash mixture composed of sulfur dioxide, water, and cyclohexanone to recover phosphate values; wherein for each pound of water in the wash mixture, 3 to 24 pounds of cyclohexanone and zero to saturation values of sulfur dioxide are used;
4. recycling phosphate containing wash effluent from step 3 supra to step 1 supra;
5. heating washed solids from step 3 supra for 15 to 75 minutes at temperatures from 156° to 200° C. to recover cyclohexanone and sulfur dioxide;
6. recycling recovered cyclohexanone and sulfur dioxide from step 5 supra to step 1 supra;
7. distilling sulfur dioxide from the liquid separated from said reaction slurry in step 2 supra to precipitate dicalcium phosphate;
8. separating said dicalcium phosphate from liquid as product; and
9. recycling liquid from step 8 supra to step 1 supra.

7. The process of claim 6 wherein step 4 thereof said wash effluent from step 3 is combined with liquid separated from reaction slurry in step 2.

8. A process according to claim 6 wherein the temperature of the resulting reaction slurry is maintained below 35° C. for a period of time from 1 hour to 10 hours and wherein for each mole of calcium in said phosphate ore, from 2.3 to 3.2 moles of cyclohexanone and from 29 to 85 moles of water are used, and wherein the reaction slurry is kept saturated with sulfur dioxide.

9. A process for preparing dicalcium phosphate from beneficiated or unbeneficiated phosphate ore or mixtures thereof by use of sulfur dioxide, water, and benzaldehyde, which comprises the steps of:

1. mixing said phosphate ore with a mixture of sulfur dioxide, water, and benzaldehyde while maintaining the temperature of the resulting reaction slurry below 50° C. for a period of time from 0.5 to 10 hours, wherein for each mole of calcium in said phosphate ore, 1.9 to 5.0 moles of benzaldehyde and 17.0 to 180.0 moles of water and 0.7 to saturation values of sulfur dioxide are used;
2. separating the solids from the liquid in said reaction slurry from step 1 supra;

3. washing said solids from step 2 supra with a wash mixture composed of sulfur dioxide, water, and benzaldehyde to recover phosphate values, wherein for each pound of water in the wash mixture, 3 to 24 pounds of benzaldehyde and zero to saturation values of sulfur dioxide are used;
4. recycling phosphate containing wash effluent from step 3 supra to step 1 supra;
5. heating washed solids from step 3 supra for 15 to 75 minutes at temperatures from 179° to 200° C. to recover benzaldehyde and sulfur dioxide;
6. recycling recovered benzaldehyde and sulfur dioxide from step 5 supra to step 1 supra;
7. distilling sulfur dioxide from the liquid separated from said reaction slurry in step 2 supra to precipitate dicalcium phosphate;
8. separating said dicalcium phosphate from liquid as product; and
9. recycling the liquid from step 8 supra to step 1 supra.

10. The process of claim 9 wherein step 4 thereof said wash effluent from step 3 is combined with liquid separated from the reaction slurry in step 2.

11. A process according to claim 9 wherein the temperature of the resulting reactin slurry is maintained below 35° C. for a period of time from 1 to 10 hours, wherein for each mole of calcium in said phosphate ore, from 2.3 to 3.2 moles of benzaldehyde and from 29 to 85 moles of water are used, and wherein the reaction slurry is kept saturated with sulfur dioxide.

12. A process for preparation of dicalcium phosphate from beneficiated or unbeneficiated phosphate ore or mixtures thereof by use of sulfur dioxide, water, and formaldehyde, which comprises the steps of:
    1. mixing said phosphate ore with a mixture of sulfur dioxide, water, and formaldehyde while maintaining the temperature of the resulting reaction slurry below 50° C. for a period of time from 0.5 to 10 hours, wherein for each mole of calcium in said phosphate ore, 1.9 to 13 moles of formaldehyde and 4.7 to 100 moles of water and 0.7 moles to saturation values of sulfur dioxide are used;
    2. separating the solids from the liquid in said reaction slurry from step 1 supra;
    3. washing said solids from step 2 supra with a wash mixture composed of sulfur dioxide, water, and formaldehyde to recover phosphate values, wherein for each pound of water in the wash mixture, 0.1 to 0.4 pounds of formaldehyde and zero to saturation values of sulfur dioxide are used;
    4. recycling phosphate containing wash effluent from step 3 supra to step 1 supra;
    5. heating washed solids from step 3 supra for 15 to 75 minutes at temperatures from 90° to 200° C. to recover formaldehyde and sulfur dioxide;
    6. recycling recovered formaldehyde and sulfur dioxide from step 5 supra to step 1 supra;
    7. distilling sulfur dioxide from the liquid separated from reaction slurry in step 2 supra to precipitate dicalcium phosphate;
    8. separating said dicalcium phosphate from liquid as product; and
    9. recycling the liquid from step 8 supra to step 1 supra.

13. The process of claim 12 wherein step 4 thereof said wash effluent from step 3 is combined with liquid separated from reaction slurry in step 2 supra.

14. A process according to claim 12 wherein the temperature of the resulting reaction slurry is maintained below 35° C. for a period of time from 1 hour to 10 hours, wherein for each mole of calcium in said phosphate ore, from 2.3 to 11.5 moles of formaldehyde and from 11 to 88 moles of water are used, and wherein the reaction slurry is kept saturated with sulfur dioxide.

* * * * *